United States Patent
Mirfakhraei et al.

(10) Patent No.: US 11,275,366 B2
(45) Date of Patent: Mar. 15, 2022

(54) ADAPTIVELY CALIBRATED SPATIO-TEMPORAL COMPRESSIVE SENSING FOR SENSOR NETWORKS

(71) Applicant: Cisco Technology, Inc., San Jose, CA (US)

(72) Inventors: Khashayar Mirfakhraei, Los Altos, CA (US); Amir Hosein Kamalizad, San Mateo, CA (US); Ardalan Alizadeh, San Jose, CA (US); Xu Zhang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 387 days.

(21) Appl. No.: 16/405,064

(22) Filed: May 7, 2019

(65) Prior Publication Data

US 2020/0356086 A1    Nov. 12, 2020

(51) Int. Cl.
*G05B 23/02* (2006.01)
*G01D 5/00* (2006.01)

(52) U.S. Cl.
CPC ........... *G05B 23/0221* (2013.01); *G01D 5/00* (2013.01)

(58) Field of Classification Search
CPC ...... G05B 23/0221; G01D 5/00; G01D 21/00; H04L 67/12

(Continued)

(56) References Cited

U.S. PATENT DOCUMENTS 6,944,607 B1 *  9/2005  Zhang ................. G06K 9/6223
                                                              706/20
8,521,473 B2 *  8/2013  Castro .................... G06F 17/18
                                                              702/181

(Continued)

FOREIGN PATENT DOCUMENTS

CN          105682171 B       3/2017

OTHER PUBLICATIONS

Songcen Xu, Distributed Compressive Estimation Based on Compressive Sensing (Year: 2015).*

(Continued)

*Primary Examiner* — Michael P Nghiem
*Assistant Examiner* — Dacthang P Ngo
(74) *Attorney, Agent, or Firm* — Behmke Innovation Group LLC; James M. Behmke; Jonathon P. Western

(57)    ABSTRACT

In one embodiment, a management entity monitors for a change in a convergence rate of spatio-temporal compressive sensing measurements from a plurality of sensors in a sensor network operating according to a measurement matrix up to a halting criterion, and if the change is below a given threshold, determines whether the change is due to impulse noise or due to continued sensed measurements. If continued sensed measurements, the management entity initiates a single-dimensional compressive sensing in a spatial domain at regular time intervals, and identifies and tracks gradient clusters. In response to a change in joint spatio-temporal sparsity of tracked nodes of the gradient clusters, the management entity can then determine an updated measurement matrix based on the joint spatio-temporal sparsity of tracked nodes while satisfying one or more operating parameters, and directs at least certain sensors of the plurality of sensors to operate according to the updated measurement matrix.

20 Claims, 15 Drawing Sheets

(58) Field of Classification Search
USPC ........................................................ 702/193
See application file for complete search history.

(56) References Cited

U.S. PATENT DOCUMENTS

| | | |
|---|---|---|
| 8,983,793 B2 | 3/2015 | Luo et al. |
| 2017/0284839 A1 | 10/2017 | Ojala |
| 2018/0213348 A1 | 7/2018 | Natarajan et al. |

OTHER PUBLICATIONS

Charalampidis, et al., "Rate-Adaptive Compressive Sensing for IoT Applications", 2015 IEEE 81st Vehicular Technology Conference (VTC Spring), Glasgow, UK, pp. 1-5, IEEE.

Chen, et al., "Optimizing Compressive Sensing in the Internet of Things", Future Wireless Networks and Information Systems, Lecture Notes in Electrical Engineering, pp. 253-262, 2012, Springer, Berlin, Heidelberg.

Chou, et al., "Energy efficient information collection in wireless sensor networks using adaptive compressive sensing", 2009 IEEE 34th Conference on Local Computer Networks, Zurich, pp. 443-450, 2009, IEEE.

Duarte, et al., "Distributed Compressed Sensing of Jointly Sparse Signals", Conference Record of the Thirty-Ninth Asilomar Conference on Signals, Systems and Computers, Pacific Grove, CA, pp. 1537-1541, 2005, IEEE.

Duarte, et al., "Kronecker Compressive Sensing", IEEE Transactions on Image Processing (vol. 21, Issue: 2, Feb. 2012), 25 pages, 2011, IEEE.

Mahmudimanesh, et al., "Efficient Saptio-Temporal Sampling in Wireless Sensor Networks Based on Compressive Sampling", Dissertation, 176 pages, 2015, Vom Fachbereich Informatik der Technischen Universität Darmstadt genehmigte.

Fragkiadakis, et al., "Adaptive compressive sensing for energy efficient smart objects in IoT applications", 2014 4th International Conference on Wireless Communications, Vehicular Technology, Information Theory and Aerospace & Electronic Systems (VITAE), Aalborg, pp. 1-5, 2014, IEEE.

Fragkiadakis, et al., "A practical implementation of an adaptive Compressive Sensing encryption scheme", 2016 IEEE 17th International Symposium on A World of Wireless, Mobile and Multimedia Networks (WoWMoM), Coimbra, pp. 1-6, 2016, IEEE.

Lavrenko, et al., "On the SNR Variability in Noisy Compressed Sensing", IEEE Signal Processing Letters, vol. 24, No. 8, pp. 1148-1152, Aug. 2017, IEEE.

Liu, et al., "Noise-resilient distributed compressed video sensing using side-information-based belief propagation", 2012 3rd IEEE International Conference on Network Infrastructure and Digital Content, Beijing, pp. 350-390, 2012.

Meena, et al., "Noise Resilient Recovery Algorithm for Compressed Sensing", arXiv:1412.5344v1, pp. 1-31, Dec. 17, 2014., arXiv.org.

Needell, et al., "Cosamp: Iterative Signal Recovery From Incomplete and Inaccurate Samples", arXiv:0803.2392v2, pp. 1-30, Apr. 17, 2008., arXiv.org.

Qaisar, et al., "Compressive Sensing: From Theory to Applications, a Survey", Journal of Communications and Networks, vol. 15, No. 5, pp. 443-456, Oct. 2013, KICS.

Wang, et al., "Data gathering in wireless sensor networks through intelligent compressive sensing", 2012 Proceedings IEEE Infocom, Orlando, FL, pp. 603-611, 2012, IEEE.

\* cited by examiner $\mathbf{y} = \Phi \mathbf{x}$ $N \times 1$
SPARSE SIGNAL $K$ NONZERO ENTRIES $\Phi$ $M \times N$ $M \times 1$ MEASUREMENTS $K < M \ll N$

FIG. 4

ADAPTIVELY CALIBRATED SPATIO-TEMPORAL COMPRESSIVE SENSING FOR SENSOR NETWORKS

TECHNICAL FIELD

The present disclosure relates generally to computer networks, and, more particularly, to adaptively calibrated spatio-temporal compressive sensing for sensor networks.

BACKGROUND

Use of Compressive Sensing (CS) in Wireless Sensor Networks (WSN) is known to save considerable power for the end nodes within the network. In fact, it dramatically reduces the number of measurements needed by the end nodes, thereby reducing the power consumption associated with wireless (radio frequency or "RF") communication of the measured/sensed data to the fusion center (a central data repository node). This is true whether the WSN has a star or a mesh topology. The compression associated with CS, which is principally manifested through a measurement matrix, can also be thought of as an additional "encryption" mechanism which is only fully known to the fusion center and partially at the end nodes, thereby preventing a rogue receiver from recovering the full data set from the intercepted transmission.

In the same vein, the robustness of the recovered (uncompressed) data against noise as well as power savings for the end nodes bear a direct relation to the measurement matrix. Each network manager has desired ranges of operation for parameters such as power savings, robustness against noise, and security, per eventual use of the recovered data. Nevertheless, the changing (sensing) environment will inevitably force any static compressive sensing protocol to underperform according to network manager's metrics.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates an example visualization of compressive sensing/sampling;

DESCRIPTION OF EXAMPLE EMBODIMENTS

Overview

Figure 1:
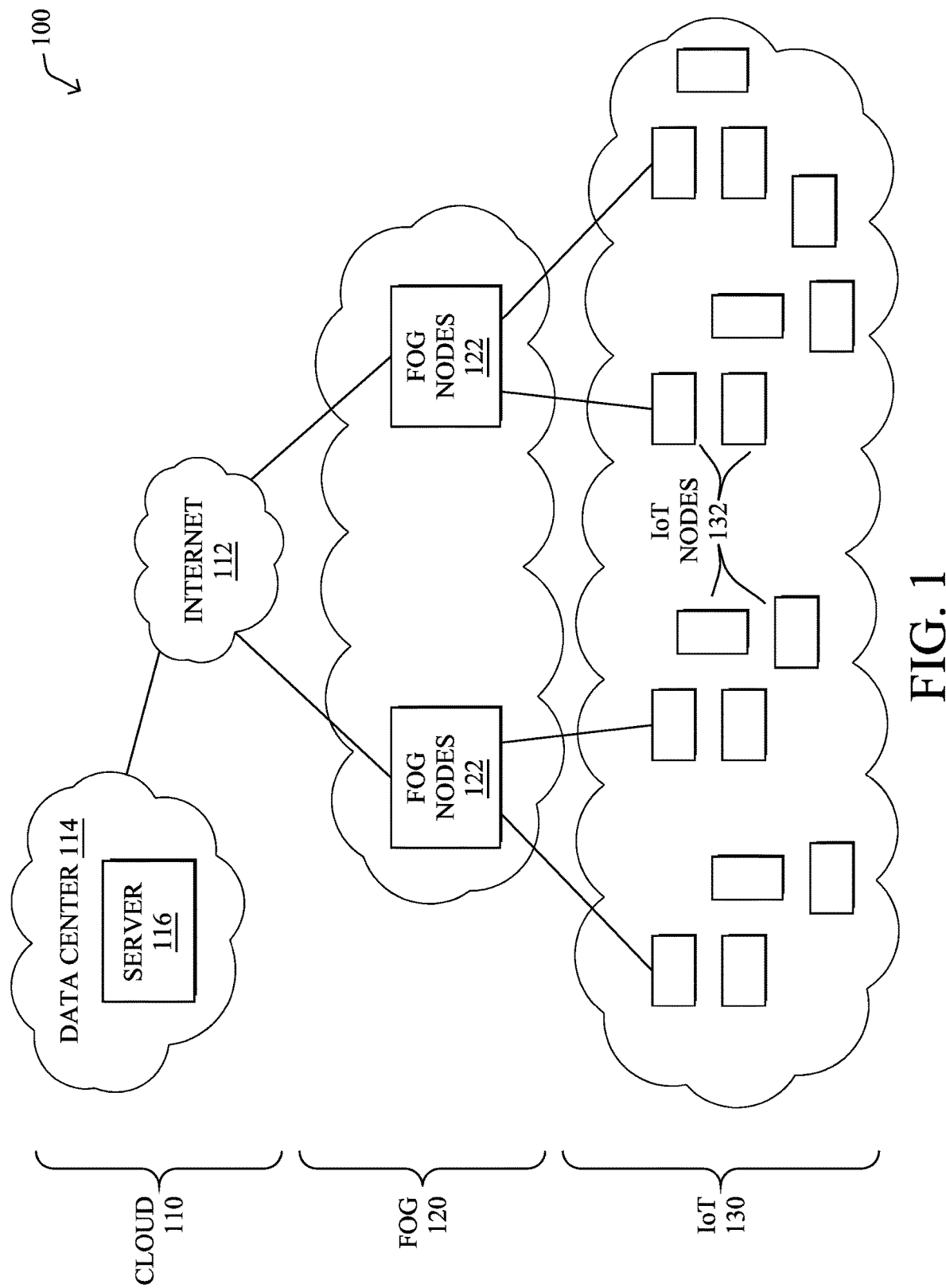
FIG. 1 illustrates an example computer (e.g., IoT/sensor) network.

According to one or more embodiments of the disclosure, a management entity for a sensor network monitors a convergence rate of spatio-temporal compressive sensing measurements from a plurality of sensors in the sensor network operating according to a measurement matrix up to a halting criterion, and in response to detecting a change in the convergence rate to a value below a given threshold, determines whether the change is due to impulse noise or due to continued sensed measurements. In response to the change in the convergence rate being due to continued sensed measurements, the management entity initiates a single-dimensional compressive sensing in a spatial domain at regular time intervals, and identifies and tracks gradient clusters from the single-dimensional compressive sensing. As such, in response to a change in joint spatio-temporal sparsity of tracked nodes of the gradient clusters, the management entity can then determine an updated measurement matrix based on the joint spatio-temporal sparsity of tracked nodes while satisfying one or more operating parameters, and directs at least certain sensors of the plurality of sensors to operate according to the updated measurement matrix.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE 1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network. For example, IoT is all about connecting real life objects to computer network for monitoring and management purpose (e.g., where the real life objects can range all the way from home appliances such as fridge and washing machine to connecting large trucks in a mine.)

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
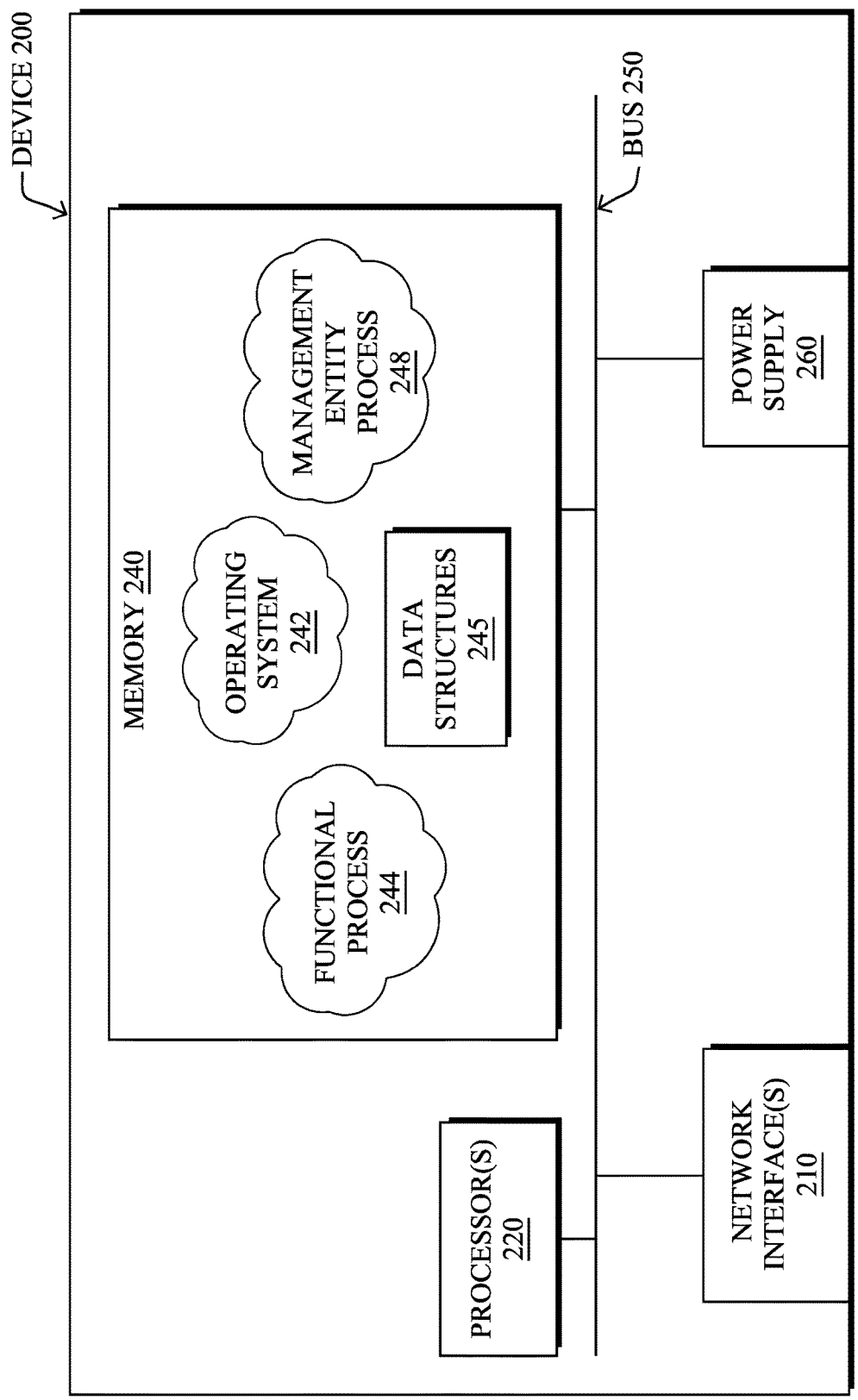
FIG. 2 illustrates an example computing device/node.

FIG. 2 is a schematic block diagram of an example node/device 200 that may be used with one or more embodiments described herein, e.g., as any of the computing devices shown in FIG. 1, particularly a server 116, fog nodes 122, or any other computing device that supports the operations of techniques herein, or any of the other devices referenced below (particularly a "management entity" device, as detailed below). The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, among other things, invoking network operations in support of software processors and/or services executing on the device. These software processors and/or services may comprise one or more functional processes 244 and illustratively, a management entity process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Functional process(es) 244 may include computer executable instructions executed by processor 220 to perform one or more specific functions of the device 200, such as one or more communication protocols, routing protocols, control protocols, etc., as will be understood by those skilled in the art. For example, depending upon the type of device within the network, particularly where the device is a multi-functional device, functional process 244 may be configured to perform specific functions corresponding to that device, such as a router performing router operations, a fog node performing fog node operations, IoT nodes performing their specifically configured functions, and so on.

Adaptively Calibrated Spatio-Temporal Compressive Sensing

As noted above, the use of Compressive Sensing (CS) in sensor networks, particularly in Wireless Sensing Networks (WSN) is known to save considerable power for the end nodes within the network, dramatically reducing the number of measurements needed and the associated power consumption. Compressive sensing (also known as compressed sensing, compressive sampling, or sparse sampling) is a signal processing technique for efficiently acquiring and reconstructing a signal, by finding solutions to underdetermined linear systems. This is based on the principle that, through optimization, the sparsity of a signal can be exploited to recover it from far fewer samples than required by the Shannon-Nyquist sampling theorem. There are two conditions under which recovery is possible: sparsity, which requires the signal to be sparse in some domain; or incoherence, which is applied through the isometric property which is sufficient for sparse signals.

As also mentioned above, the compression associated with CS adds a level of encryption to the data, as the corresponding measurement matrix is only known to the fusion center and partially at the end nodes, and not by any potential rogue receiver that may intercept the transmission. Moreover, the robustness of the recovered (uncompressed) data against noise as well as power savings for the end nodes bear a direct relation to the measurement matrix. Typically, there are desired ranges of operation for parameters of the compressive sensing, such as power savings, robustness against noise, and security, per eventual use of the recovered data.

Nevertheless, the changing (sensing) environment will inevitably force any static compressive sensing protocol to under-perform according to network manager's metrics. In order to address the change in sensing environment (e.g., noise in the sensing or communication environment, sensed modality's gradient/statistics across space and time, network attack frequency, etc.), and to stay within the network manager's operational parameters, the measurement matrix needs to adapt accordingly.

The techniques herein, therefore, provide a protocol (algorithm) to detect the changes and adaptively update the measurement matrix for a generic two-dimensional (e.g., time and space) compressive sensing protocol. In particular, the techniques herein enable adaptation of spatio-temporal compressive sensing (e.g., in a WSN) in order to address power savings, robustness against noise, and security needs of the network, in a changing sensing and RF environment.

Specifically, according to one or more embodiments of the disclosure as described in detail below, a management entity for a sensor network monitors a convergence rate of spatio-temporal compressive sensing measurements from a plurality of sensors in the sensor network operating according to a measurement matrix up to a halting criterion, and in response to detecting a change in the convergence rate to a value below a given threshold, determines whether the change is due to impulse noise or due to continued sensed measurements. In response to the change in the convergence rate being due to continued sensed measurements, the management entity initiates a single-dimensional compressive sensing in a spatial domain at regular time intervals, and identifies and tracks gradient clusters from the single-dimensional compressive sensing. As such, in response to a change in joint spatio-temporal sparsity of tracked nodes of the gradient clusters, the management entity can then determine an updated measurement matrix based on the joint spatio-temporal sparsity of tracked nodes while satisfying one or more operating parameters, and directs at least certain sensors of the plurality of sensors to operate according to the updated measurement matrix.

Illustratively, the techniques described herein may be performed by hardware, software, and/or firmware, such as in accordance with the management entity process 248, which may include computer executable instructions executed by the processor 220 to perform functions relating to the techniques described herein, e.g., in conjunction with other processes on other devices (e.g., a management entity cooperating with a plurality of managed sensors, as described below).

As a background, compressive sensing (CS) is an emerging technology in the field of signal processing. CS can benefit sensor networks by saving time, money, complexity, power, storage, memory, bandwidth, etc. Traditionally most CS literature has focused on single dimensional compression and measurement (compressive sensing). More recently few techniques have addressed the problem of two-dimensional compressive sensing, namely time (temporal) and space (spatial), where the joint sparsity of the two-dimensional data is considered in deriving the measurement matrix and recovery algorithms. However, though single-dimensional CS adaptation for changes in the sensing environment has been discussed, calibration/adaptation of joint spatio-temporally compressed measurements have not been addressed until the present disclosure.

Operationally, the techniques herein focus is on adapting the sensing/measurement to the changing environmental parameters which are mainly:

Joint sparsity/statistics of the sensed modality (data) in time and space;
Noise in the communication channel, or sensing medium; and
Privacy needs of the network (frequency of attack on the network).

Through the adaptation of the Wireless Sensor Network (WSN), a Management Entity (ME) can address:

Robustness against sensing or RF communication noise, and adequate fidelity in recovery of the data at the fusion center;
Power savings for the end nodes; and
Additional layer of security/privacy through use of the randomized measurement matrix.

Figure 3:
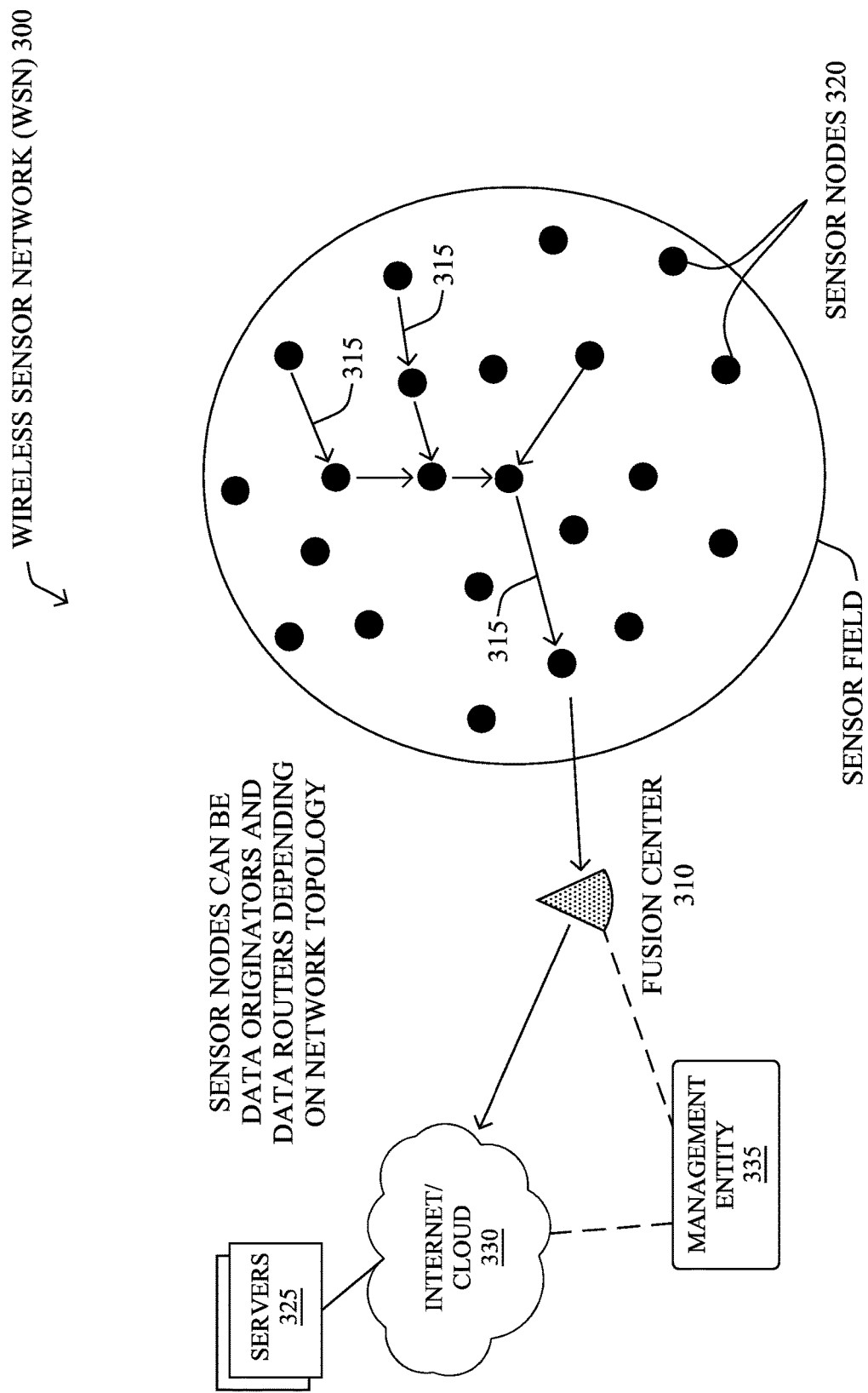
FIG. 3 illustrates an example architecture of a wireless sensor network (WSN)

FIG. 3 illustrates an alternative view of a wireless sensor network (WSN) 300 (e.g., a type of computer network 100), where a Fusion Center (FC) 310 is in charge of aggregating the CS collected data 315 from the plurality of sensors 320 (e.g., of a sensor field or field area network). The data 315 may be then be recovered (uncompressed or decompressed) either at the FC 310 or else by one or more other devices (e.g., servers 325) in the cloud 330, using iterative recovering algorithms, such as by variants of Orthogonal Matching Pursuit (OMP) or other techniques, as will be understood by those skilled in the art.

A Management Entity (ME) 335, which could reside either at FC 310 or in the cloud 330 (e.g., as a standalone device or as a process operating on another device or server), monitors the network operating parameters and/or initiates changes in the CS protocol, particularly as described herein (e.g., as management entity process 248).

To better understand general compressive sensing paradigms, FIG. 4 represents an example visualization 400 of compressive sensing/sampling (e.g., as credited to compressive sensing tutorial lectures by Richard Baraniuk (Rice University), Justin Romberg (Georgia Institute of Technology), and Emmanuel Candes (Stanford University)), where when data is sparse (i.e., compressible), one can directly acquire a condensed representation of the actual data with no (or little/negligible) information loss through a linear dimensionality reduction as:

$$y = \Phi x \qquad \text{Eq. 1.}$$

As shown, $\Phi$ (phi) is a measurement matrix that is used for compression and decompression between measurements y and sparse signal x. K signifies joint sparsity of the spatio-temporal sensed modality (data), M is the number of measurements conducted to recover the N (total number of end nodes) values of the end nodes sensors. Therefore, dimensions of the sensing matrix (M×N where K<M<<N) determines the compression ratio (M/N), noise immunity (larger M means more immune to noise), and security (smaller M corresponds to higher attack immunity).

As an example, it is of interest for any sensed modality to determine an "appropriate" amount of information that can/should be sent, that is, sampling the entity at some compressed rate. As will be understood by those skilled in the art, any modality sensed with some gradient in it (e.g., time or space) can be compressed and recovered, thus requiring fewer samples to achieve an adequate level of sensed information. For instance, as shown in FIGS. 5A-5B, assume an example sensor network comprising temperature sensors across a floor of a building.

Figure 5A:
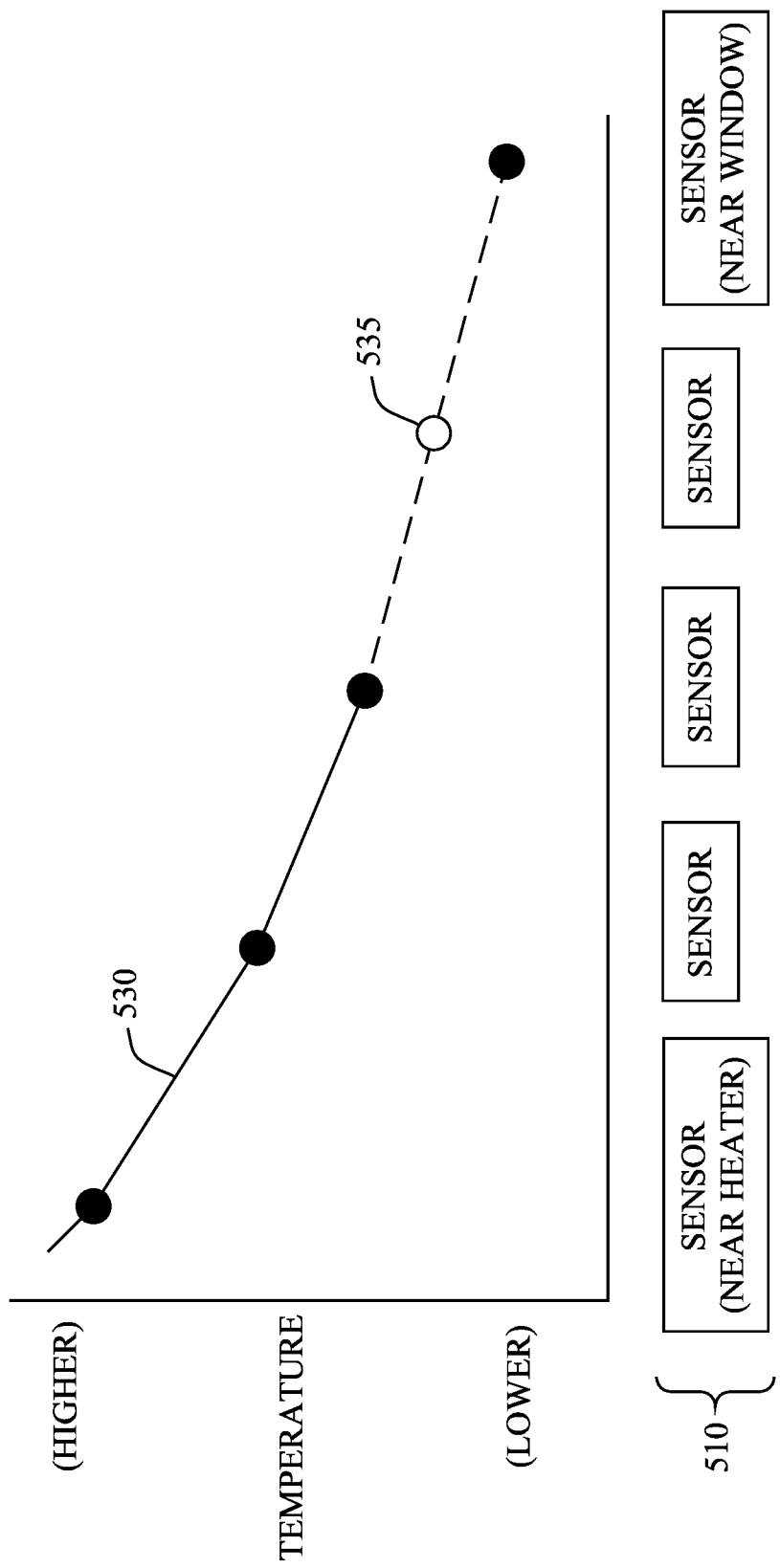
FIGS. 5A-5C illustrate examples of compressive sensing and data recovery.

In the space dimension (FIG. 5A, represented linearly for simplicity of illustration), there is typically no abruptness to the graph of sensed data—sensors 510 closer to heaters will sense higher temperatures, gradually decreasing in temperature as sensors nearer to a window report cooler temperatures. If any sensed data along the graph 530 of the sensed temperatures (e.g., between the heater and the window) is missing (e.g., portion 535), it is generally appreciated that this missing data can be recovered with high fidelity. (Note that the view shown in FIG. 5A is vastly simplified: single temperature measurements may be made by a sensor—e.g., X-degrees at the sensor, or else a range of temperatures across the space may be measured, such as using infrared scanning of a space—e.g., an infrared image of a space indicating a temperature at each point in the image, resulting in a more granular graph 530.)

Figure 5B:
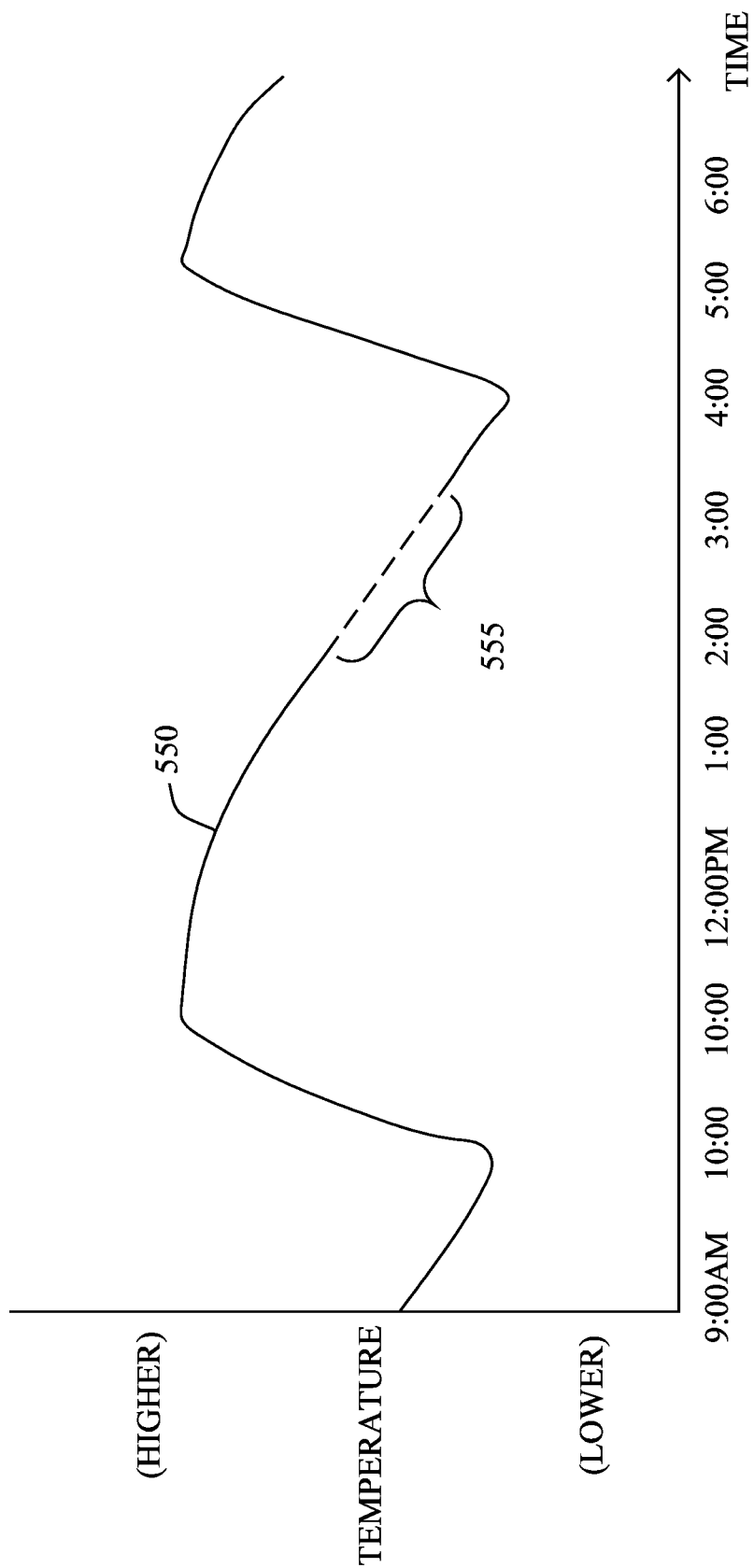

In the time dimension, as shown in FIG. 5B for a single sensor for ease of illustration, assume that a heater turns on at 10:00 AM until 11:00 AM, and then remains off until turning back on from 4:00 PM to 5:00 PM. As shown by graph 550, while the heater is on, the temperature sensed rises quickly, and then while the heater is off, the temperature decreases slowly. Since there are gradients in this sensed modality as well, any missing sensed data 555 can be easily reconstructed from a sparse data set according to compressive sensing techniques.

Figure 5C:
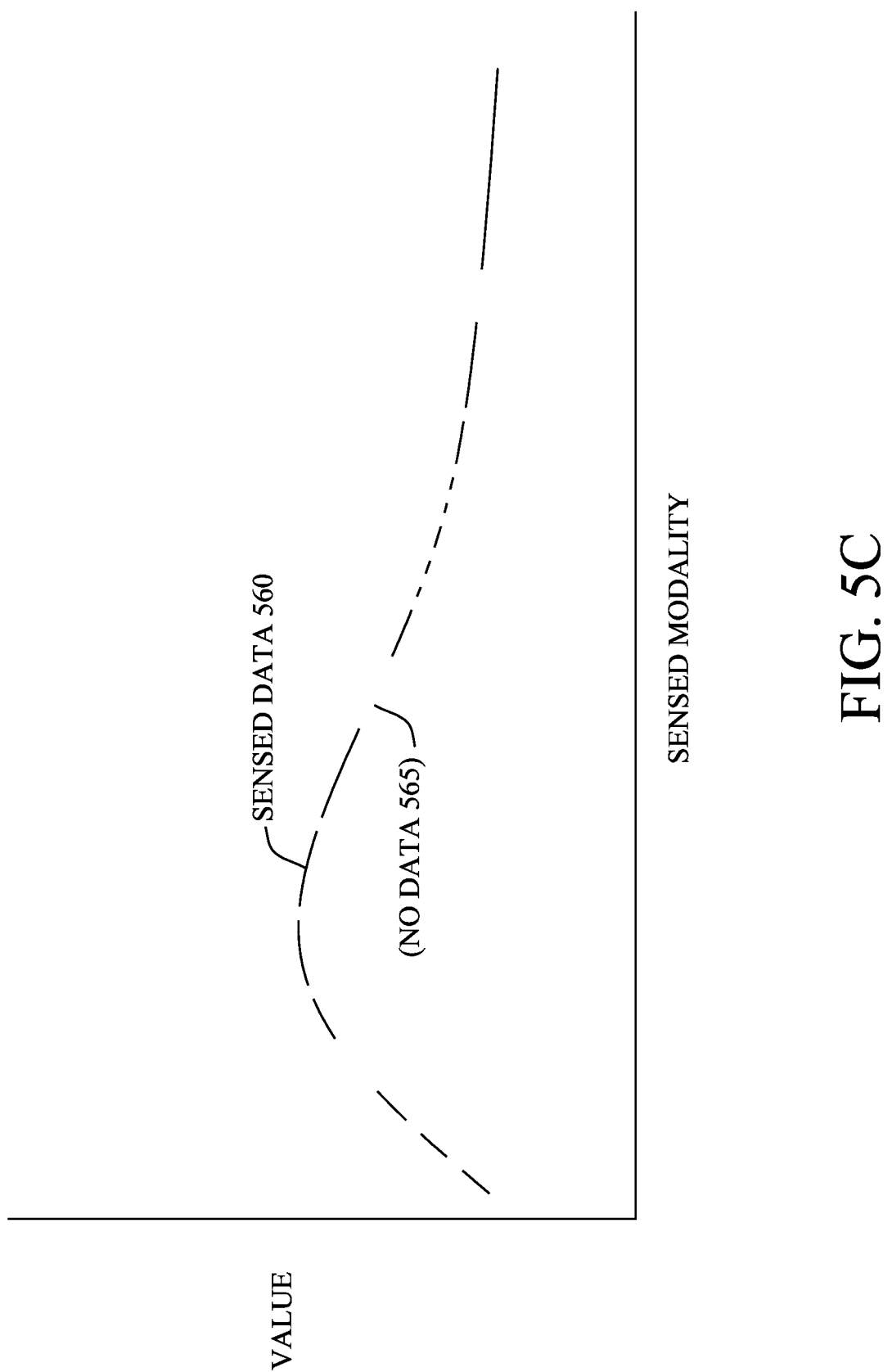

Specifically regarding compressive sensing, assume that distinct/extended portions (e.g., 535 or 555) are not necessarily missing, but that the data across the entire measurement is sparsely populated with dispersed portions of missing (compressed or un-sensed) data. For instance, FIG. 5C illustrates this aspect, where a sufficient set of sensed data points 560 can still produce an accurate picture of any sensed modality without the "no data" points 565 (whether regularly spaced or otherwise). In this sense, the data 560 are the measurements y above, and an appropriately chosen measurement matrix $\Phi$ (phi) can, in essence, "fill in the blanks" (no data points 565) to recover or otherwise understand/present a full (and mostly accurate) picture of the data.

Figure 6A:
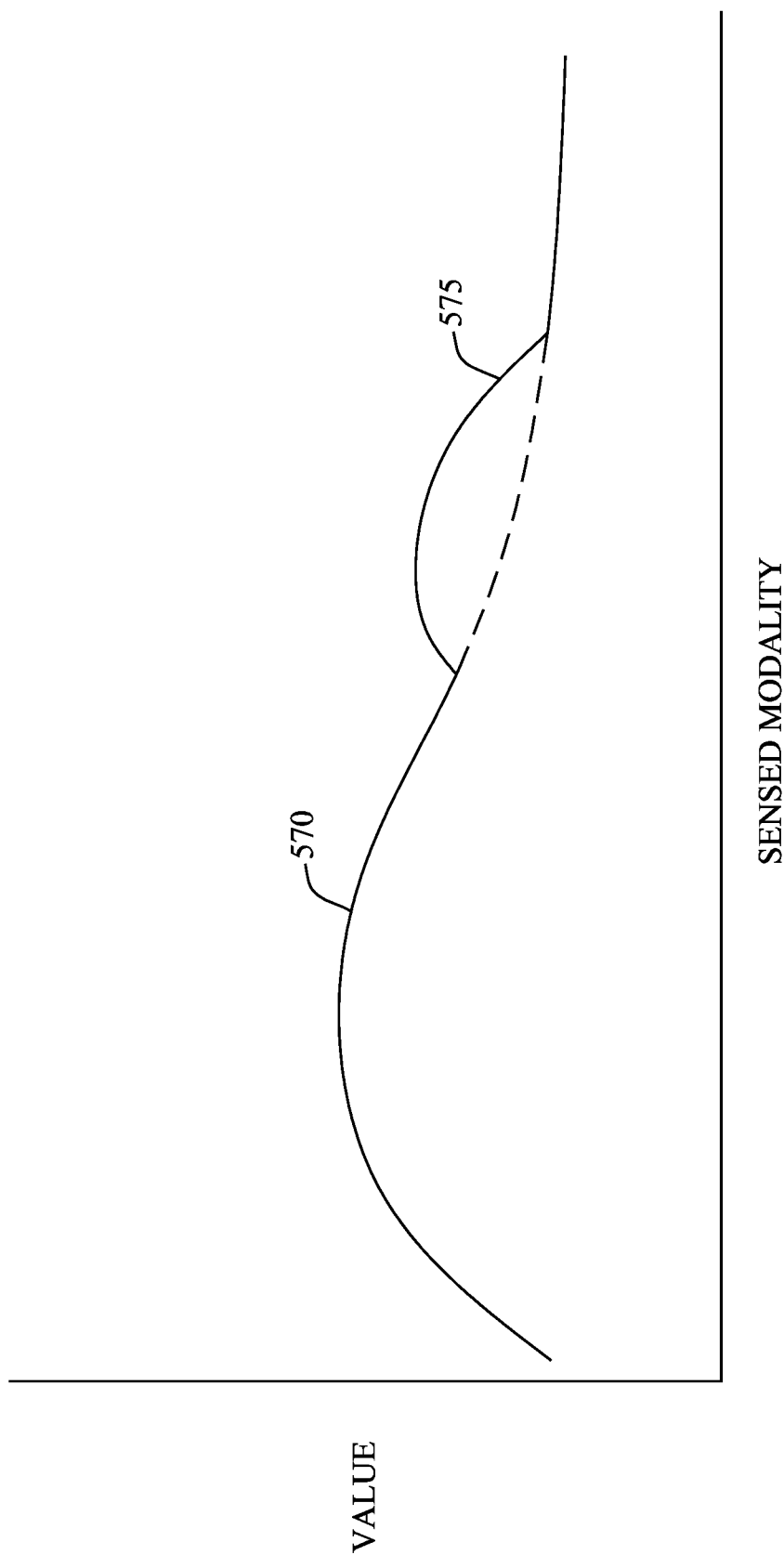
FIGS. 6A-6B illustrate examples of changes in sensed data versus expected data.
Figure 6B:
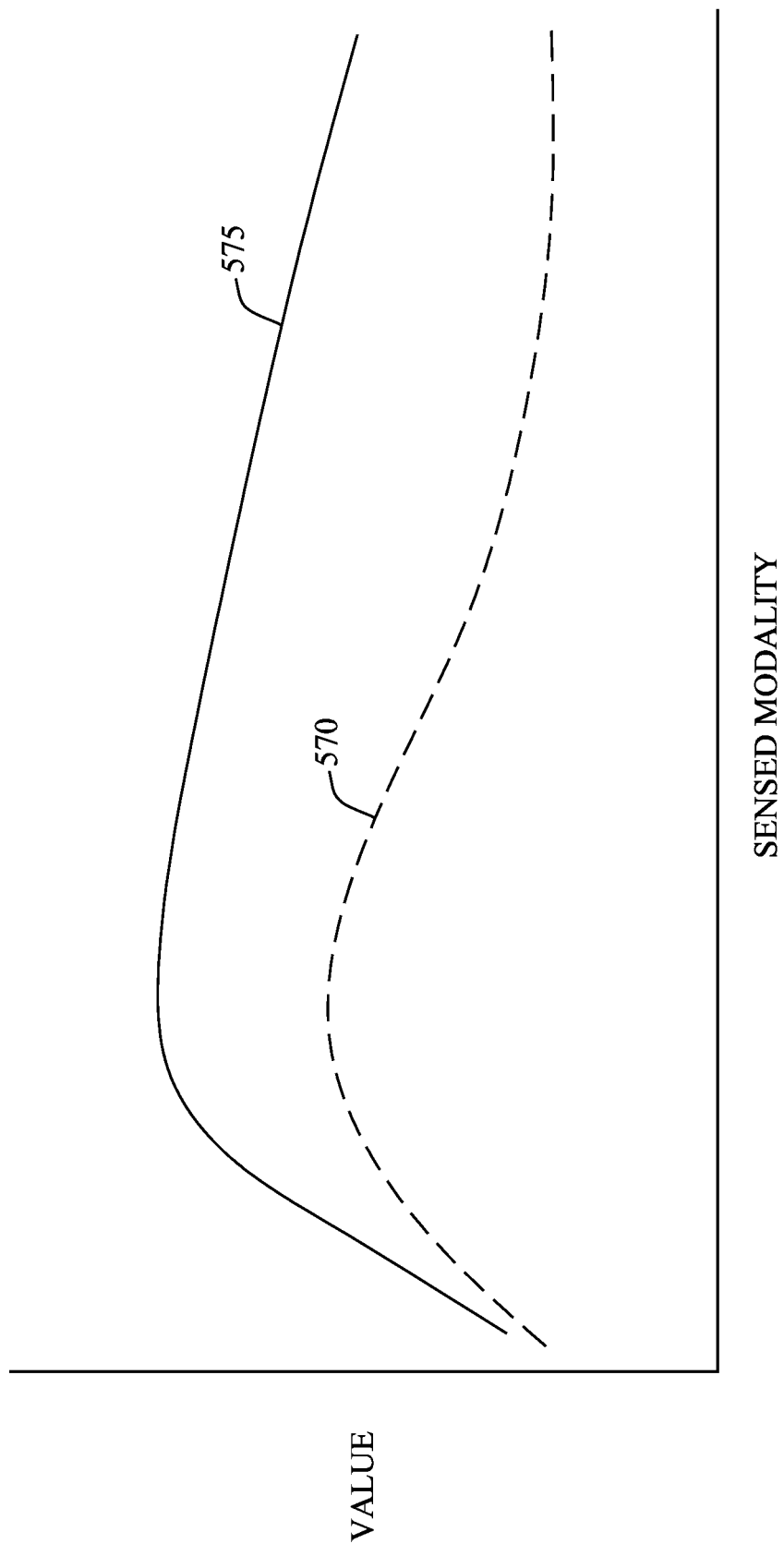

Various techniques for compressing space and time are known in the art. However, as the sensing environment changes, these known techniques do not adapt the measurement and recovery of sensed modalities according to the new environment. For example, assume that as shown in FIG. 6A-6B, a change in values 575 occurs, which is different from the originally "expected" gradient from graph 570 (FIG. 6A illustrating a localized change, FIG. 6B illustrating a global change), such as based on a current measurement matrix $\Phi$ (phi) for the sensed data. Detecting these changes, and how to adjust sensing and reporting schemes based on these changes, are important questions. For instance, in the example of temperature sensing above, the change could be due to a new heater being added to the room, or a new heater schedule, or both. At the same time, however, the change could be due to someone opening a window briefly or sun coming through the window for a few minutes as clouds clear. In other words, the changes may only be temporary impulses (notably due to actual changes in sensed conditions or perhaps noise on the communication channel), or else the changes may be repeated/cyclical or long term. The techniques herein thus address these questions and intelligently adapt the calibration of two-dimensional (e.g., spatio-temporal) compressive sensing, accordingly.

Figure 7A:
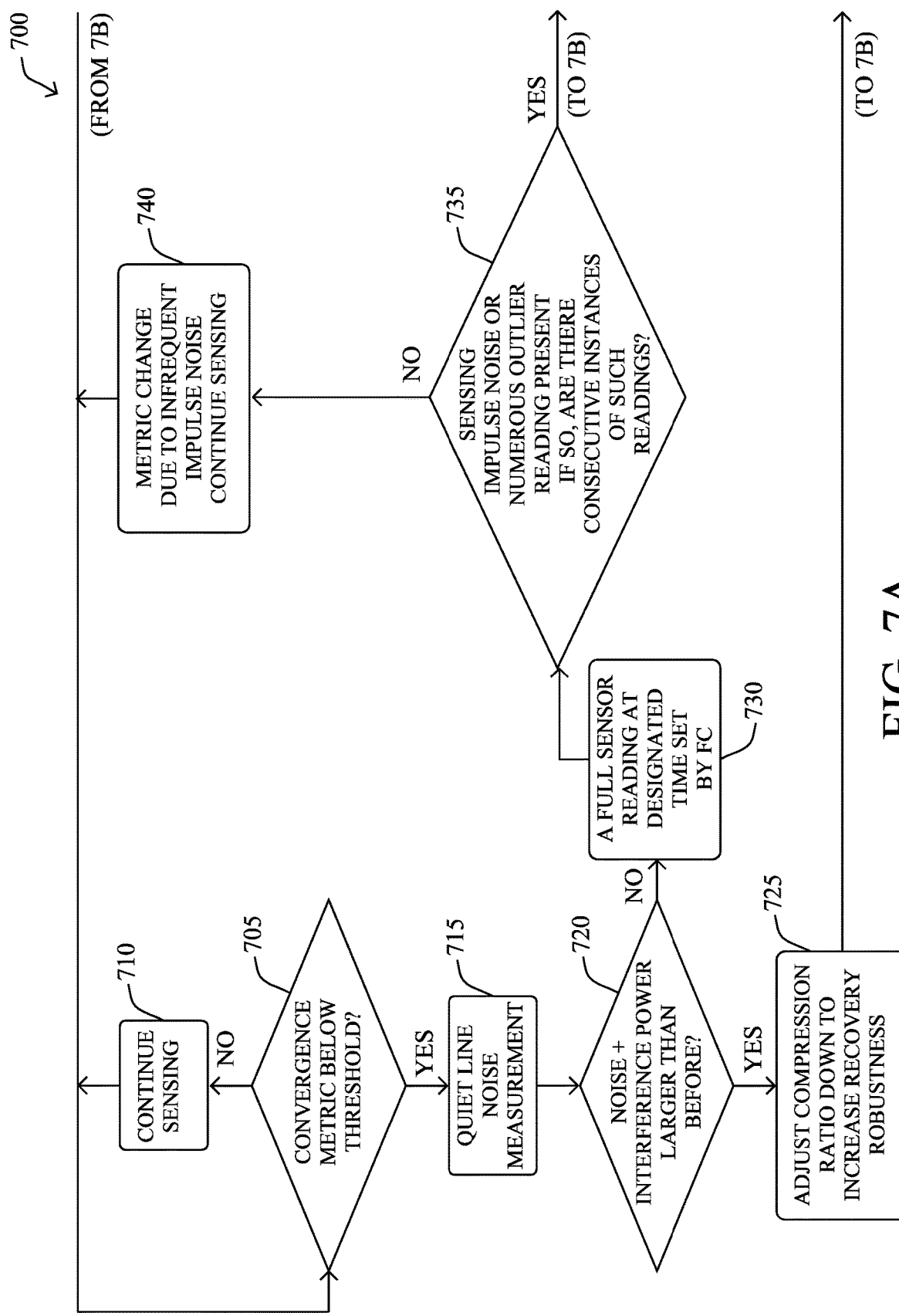
FIGS. 7A-7B illustrate an example of adaptive calibration of joint spatio-temporal compressive sensing measurements.
Figure 7B:
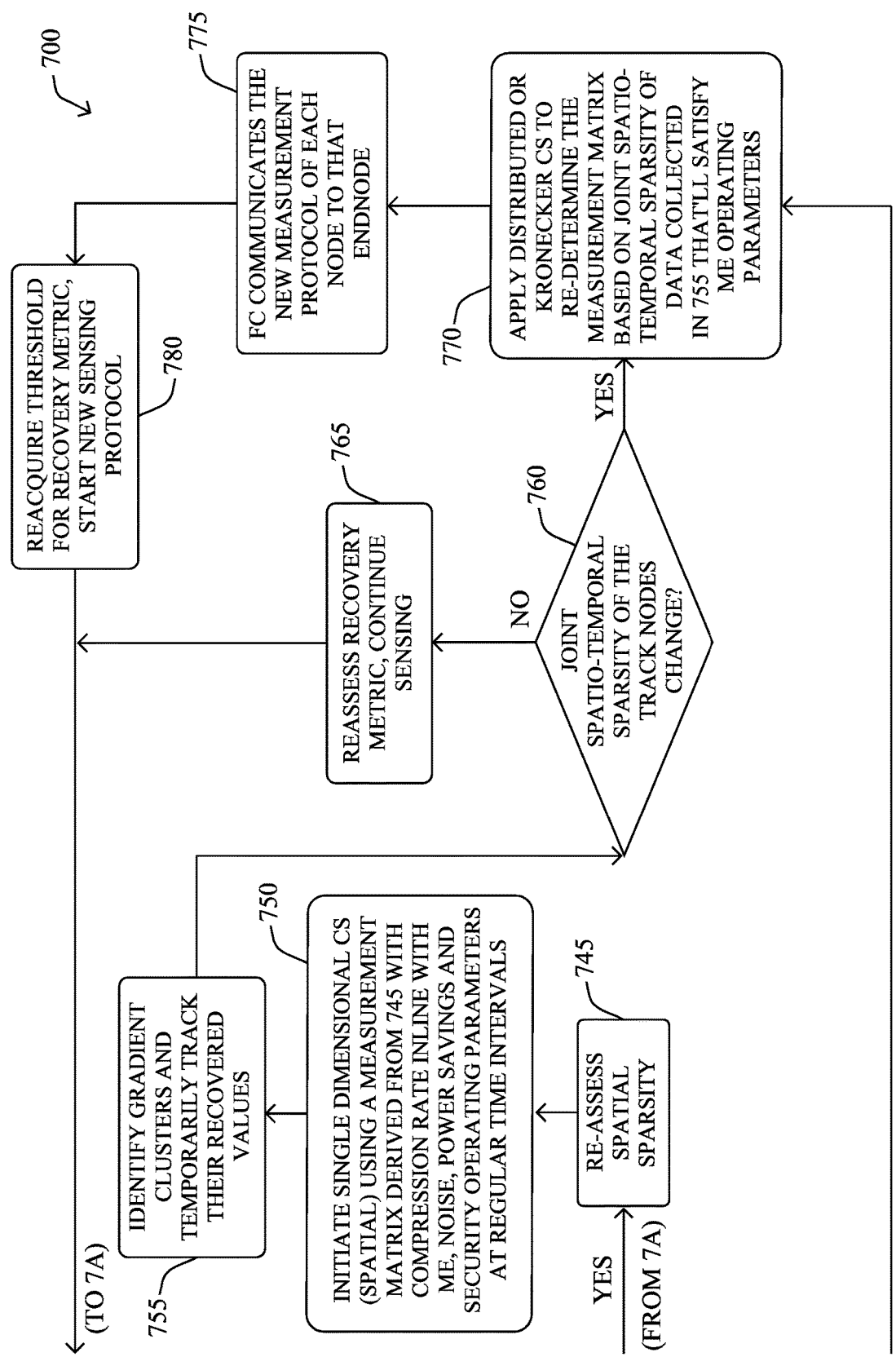

According to the embodiments herein, adaptive joint spatio-temporal compressive sensing is based generally on detection of changes and adaptation of the measurement scheme. With reference generally to FIGS. 7A-7B, an illustrative algorithm 700 for adaptive joint spatio-temporal compressive sensing is shown (e.g., an "iterative compression mechanism" performed by the management entity). The techniques herein may illustratively begin in step 705 (in FIG. 7A) with the management entity 335 monitoring a convergence rate, e.g., in terms of iterations before a halting criterion is reached. This criterion is common among many variant OMP recovery algorithms and can serve as a reliable metric for a changing environment of the sensing modality (noise, sparsity of the sensed modality, etc.). (Notably other halting criteria have been chosen, such as error approximation terms. While most error metrics tend to be correlated to the convergence rate metric, not all are as broadly applicable as an iterative recovery algorithm, which could take on many forms, and not all are necessarily in-line with variants of OMP used in joint spatio-temporal compressive sensing.)

While no change occurs, the algorithm continues sensing in step 710. However, when in step 705 the convergence rate metric shows a marked change from its normal range, e.g., is below some set threshold, this is indicative of either a change in the joint spatio-temporal sparsity of the data or an increase in the noise/interference in the communication and/or sensing environment (e.g., it could be a lasting change, or else merely noise, outliers, sensor damage, sunshine on sensor, etc.).

After detecting the metric change the management entity may then perform quiet line noise measurement in step 715. Notably, Quiet Line Noise measurement (QLN) of communication channels assesses noise/interference level without any transmission from end nodes or the fusion center (FC).

In case of mesh topology, for instance, the QLN measurement is conducted by each node and the QLN power is communicated to the FC. In a star topology, on the other hand, the FC conducts the QLN procedure.)

If in step 720 the noise and interference power is larger than before, then in step 725 the management entity can adjust the compression ratio down in order to increase recovery robustness (and proceeds to step 770, described below). Note here that depending on the variant of the recovery algorithm used (e.g., an OMP recovery algorithm), the rule of thumb is to reduce the compression rate by anywhere from 0-10% for every 3 dB increase in the noise power. Some recovery algorithms have shown resilience in face of increasing noise, however for the most part CS recovery mechanisms have shown to "fold" the noise power present in measurements.

On the other hand, if the noise and interference power is not larger than before after the QLN, then in step 730 a full sensor reading may be performed at a designated time set by the FC. This allows the management entity to determine, in step 735, whether there is sensing of impulse noise or numerous outlier readings present, and if so, whether there are consecutive instances of such readings. Impulse noises in the sensing environment are akin to a sudden jump in the sensed modality for some end nodes due to external anomalies (e.g., sensing light at night while lightning strikes). Steps 730 and 735, in particular, are used to determine whether the reduced convergence metric is due to a temporary "blip" of a signal, or if the change is continued throughout multiple readings.

If either answer in step 735 is no, then in step 740 it is assumed that the metric change is due to infrequent impulse noise, so sensing continues as before. However, if yes, then in step 745 (continuing algorithm 700 into FIG. 7B), the management entity may re-assess spatial sparsity, and initiates single-dimensional CS (e.g., spatial) in step 750 at regular time intervals using a measurement matrix derived from step 745. Notably, the measurement matrix in step 750 may illustratively have a compression rate inline with the management entity's operating parameters for noise, power savings, and security as described above. Generally, step 750 begins sensing in one dimension in order to determine what may be causing the change.

Figure 8:
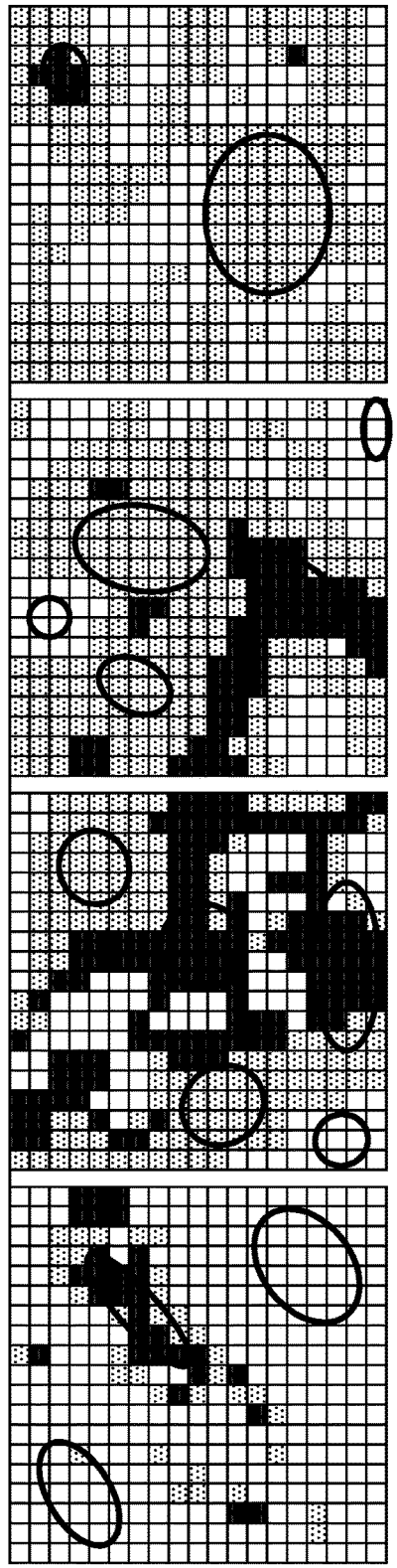
FIG. 8 illustrates an example of gradient measure of some real-world signals (in spatial dimension only)
Figure 8:
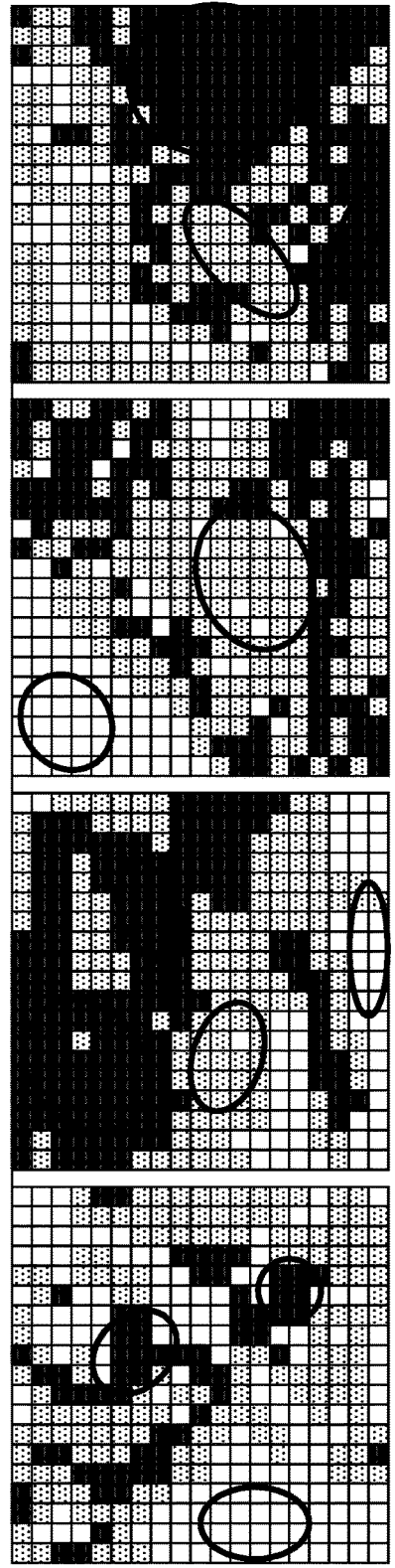
Figure 8:
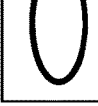

In step 755, the management entity identifies gradient clusters and temporally tracks their recovered values (i.e., testing the measurements over a given time period). Gradient clusters, in particular, refer to group of end nodes to which numerous other node values are correlated in a single dimensional sense. For example, referring to FIG. 8, various gradient measure graphs 800 of one-dimensional (e.g., spatial) signals (a)-(h) are comprised of a sensed modality (e.g., wi-fi strength, ambient temperature, solar radiation, rainfall, ocean temperature, pollution levels, etc.). As can be seen, sensed modalities by proximally situated nodes/sensors in a network tend to be spatially compressible, with example gradient clusters 810 being encircled on each graph.

Returning to FIG. 7B, in step 760, the management entity can now determine whether the joint spatio-temporal sparsity of the track nodes changed. If not, then in step 765 the recovery metric may be reassessed, and the techniques continue sensing as before. However, if the joint spatio-temporal sparsity of the track nodes has changed, then in step 770 the management entity applies either Distributed or Kronecker compressive sensing (CS) to re-determine the measurement matrix Φ (phi) based on joint spatio-temporal sparsity of data collected in step 755. In particular, the measurement matrix is determined in a manner that will still satisfy the operating parameters of the management entity, as noted above.

Figure 9:
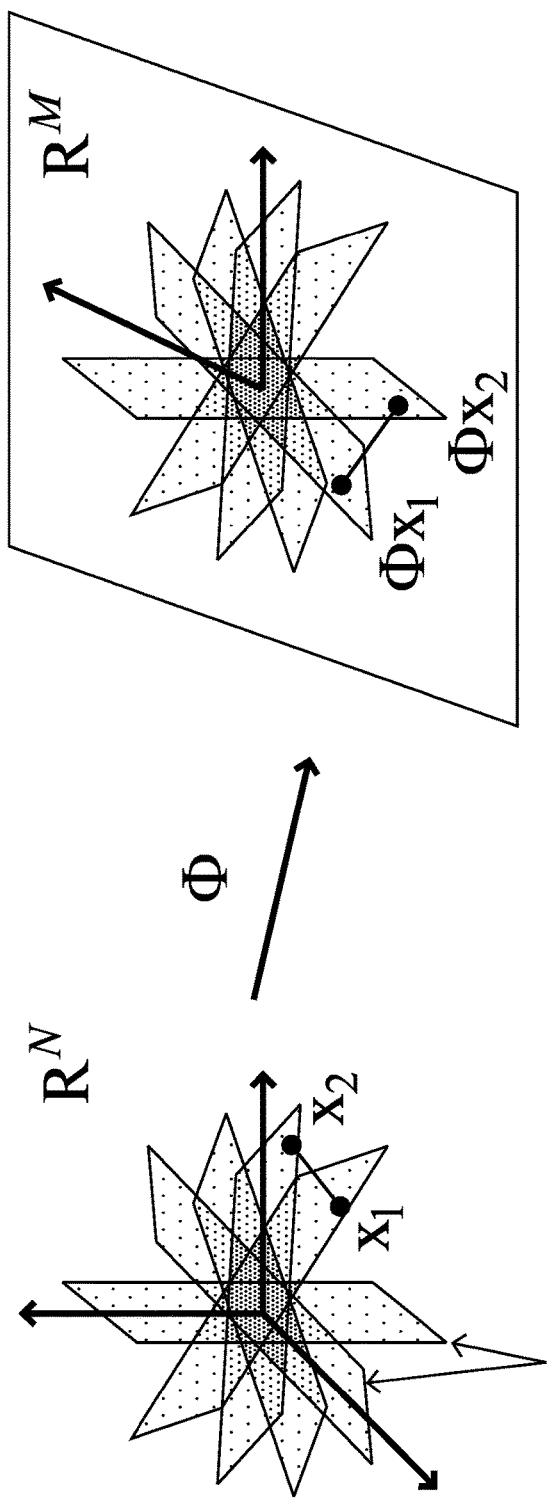
FIG. 9 illustrates an example of why a Restricted Isometry Property (RIP) is central to the choice of a measurement matrix.

Notably, central to the choice for the measurement matrix is a Restricted Isometry Property (RIP). With reference to illustration 900 of FIG. 9 (e.g., again as credited to compressive sensing tutorial lectures by Richard Baraniuk (Rice University), Justin Romberg (Georgia Institute of Technology), and Emmanuel Candes (Stanford University)), the RIP is important in the choice of the measurement matrix Φ (phi), and is used to preserve the structure of sparse/compressible signals (where here, K is the cardinality of the signals X1 and X2 in an orthogonal basis set, where typically $2k <= M << N$). The choice of M and delta(2K), when designing the measurement matrix, should enable full (N nodes) data recovery with varying quality (Signal to Recovery Noise). Generally, the smaller delta(2K) is, the better the measurement is as well. Both Kronecker and Distributed sensing have specified the tradeoffs and described a systematic way of obtaining the measurement matrix, as will be appreciated by those skilled in the art. Also, those skilled in the art will further understand the trade off in choice of M, and delta(2K), with regard to quality of recovery, robustness to RF/impulse noise, additional security, and power savings. (There are many systematic and heuristic procedures for determining M and delta(2K) for a joint spatio-temporally sensed modality, however, the choice is very specific to the statistics of the sensed modality.)

Returning again to FIG. 7B, steps 755 through 770 generally reassess if there has been a change worthy of updating to a new measurement protocol/scheme. For instance, wherein in step 760 if only one dimension changes, then in step 765 the sensing metric is reassessed, and the original sensing matrix/paradigm is used (e.g., perhaps adjusting to a longer period of time for changes to happen), resulting essentially in a "new normal". On the other hand, if an adjustment is needed, then in step 775 the management entity may instruct certain sensors/end-nodes (e.g., communicating via fusion center (FC)) to use a new measurement protocol, such as the same protocol/matrix for all sensors, or else a new measurement protocol of each node being sent specifically to that corresponding end node. In step 780, a threshold for the recovery metric may be reacquired based on the change, and the new (i.e., adaptively calibrated) sensing protocol may be started, accordingly.

Figure 10A:
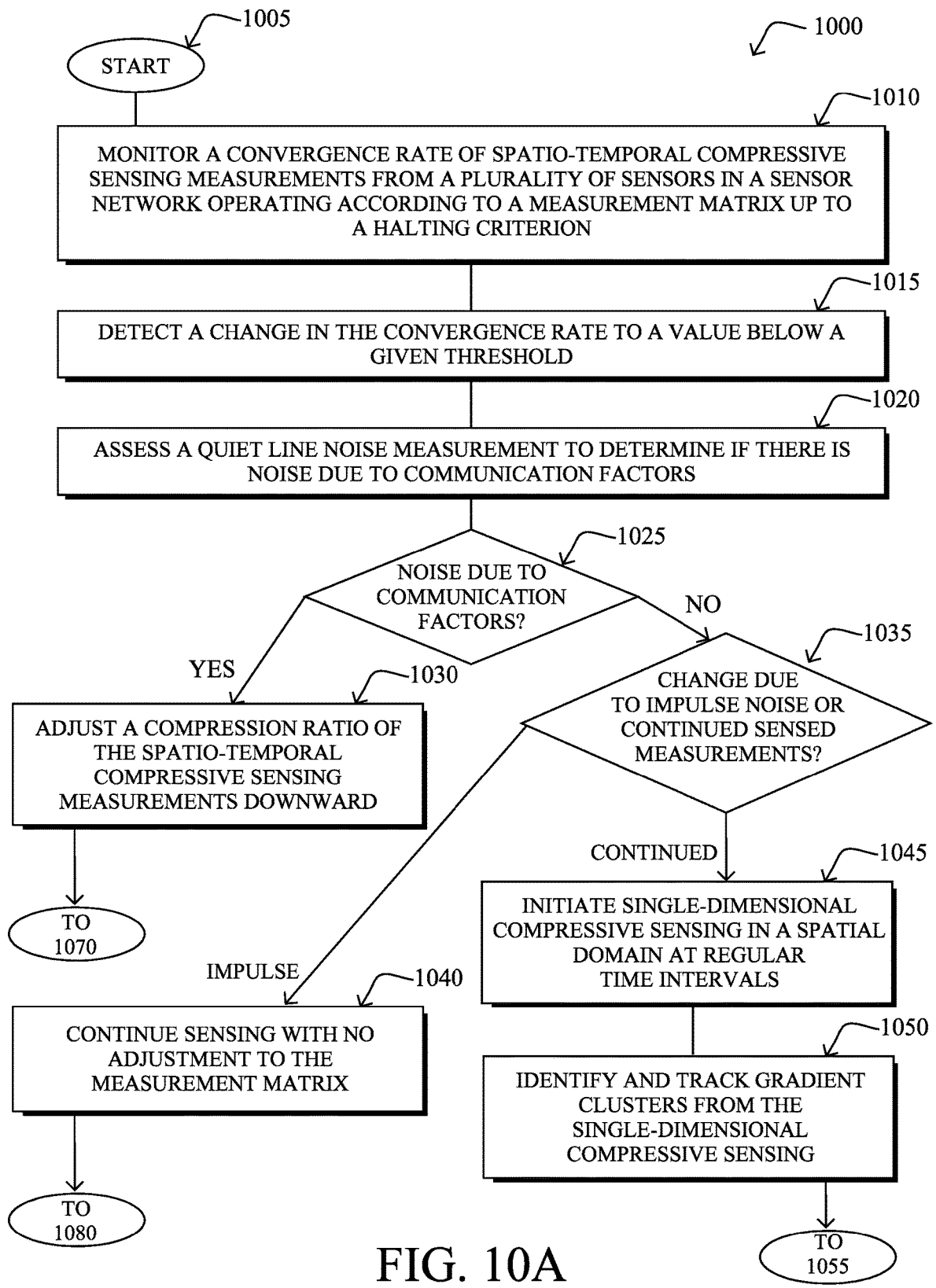
FIGS. 10A-10B illustrate an example simplified procedure for adaptively calibrated spatio-temporal compressive sensing for sensor networks.
Figure 10B:
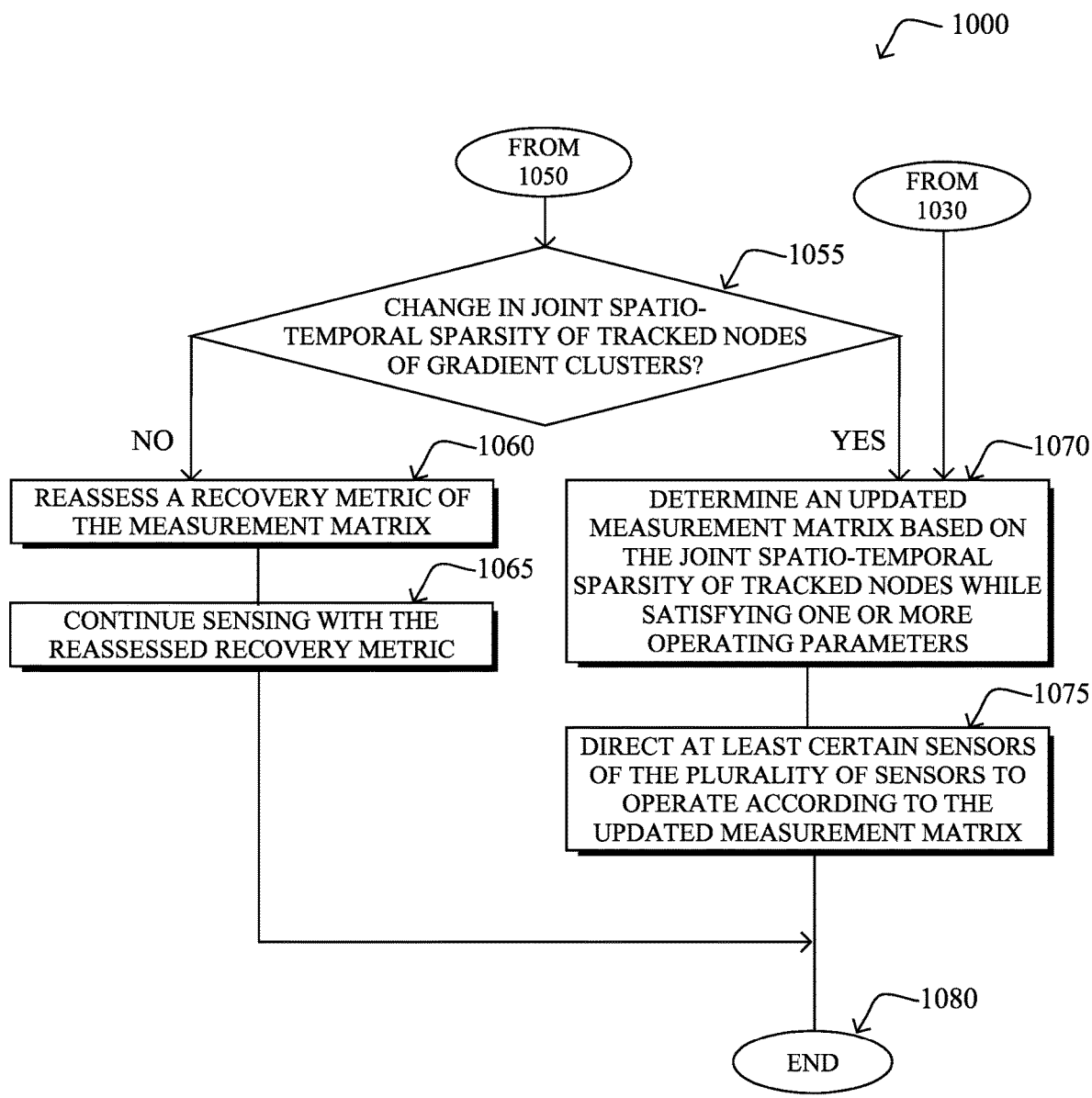

As another example of the techniques herein, FIGS. 10A-10B illustrates an example simplified procedure for adaptively calibrated spatio-temporal compressive sensing in sensor networks in accordance with one or more embodiments described herein. For example, a non-generic, specifically configured device (e.g., device 200, such as a management entity 335, whether part of a fusion center of a sensor network or in a cloud network remote from the sensor network) may perform procedure 1000 by executing stored instructions (e.g., process 248). The procedure 1000 may start at step 1005, and continues to step 1010, where, as described in greater detail above, the techniques herein monitor a convergence rate of spatio-temporal compressive sensing measurements from a plurality of sensors in the sensor network operating according to a measurement matrix up to a halting criterion (e.g., a number of iterations or otherwise). Note that as described above, the one or more operating parameters may be based on noise parameters, power saving parameters, security parameters, and so on.

In step 1015, the techniques herein detect a change in the convergence rate to a value below a given threshold (e.g., a lasting change of the joint spatio-temporal sparsity of data, an increase in noise in communication of the data, an interference in the sensor network, and so on), and in response to detecting the change in the convergence rate may, in one embodiment, assess a quiet line noise measurement (QLN) in step 1025 to determine if there is noise due to communication factors in step 1025. If so, then in step 1030, a compression ratio of the spatio-temporal compressive sensing measurements may be adjusted downward (e.g., an adjustment between 0-10% for every 3 dB increase in noise power of the noise, as noted above), and the procedure would continue to step 1070 as described below.

In step 1035 (e.g., in response to noise not being due to communication factors, or else where the QLN is not performed), the techniques herein next determine whether the change in step 1015 is due to impulse noise or due to continued sensed measurements. As described in greater detail above, determining whether the change is due to impulse noise or due to continued sensed measurements may generally comprise:

performing a full sensor reading;
determining from the full sensor reading whether a number of outlier readings are above or below an outlier threshold;
in response to the number of outlier readings being above the outlier threshold, determining whether the outlier readings are repeated over consecutive instances;
determining that the change is due to continued sensed measurements in response to determining that the outlier readings are above the outlier threshold and repeated over consecutive instances; and
determining that the change is due to impulse noise in response to determining that the outlier readings are either below the outlier threshold or not repeated over consecutive instances.

In step 1040, in response to the change in the convergence rate being due to impulse noise, the techniques herein continue sensing with no adjustment to the measurement matrix.

On the other hand, in response to the change in the convergence rate being due to continued sensed measurements, then in step 1045 the techniques herein initiate a single-dimensional compressive sensing in a spatial domain at regular time intervals (e.g., using a measurement matrix from a reassessed spatial sparsity with a compression rate inline with the one or more operating parameters). As such, in step 1050, the techniques herein may identify and track gradient clusters from the single-dimensional compressive sensing, in order to determine a change in joint spatio-temporal sparsity of tracked nodes of the gradient clusters in step 1055.

In response to there being no change in joint spatio-temporal sparsity of tracked nodes of the gradient clusters, in step 1060 the techniques herein may reassess a recovery metric of the measurement matrix, and continue sensing with the reassessed recovery metric in step 1065.

Otherwise, in response to a change in joint spatio-temporal sparsity of tracked nodes of the gradient clusters (or from step 1030 above), then in step 1070 the techniques herein determine an updated measurement matrix based on the joint spatio-temporal sparsity of tracked nodes, notably while satisfying the one or more operating parameters (and, in one embodiment, may also redefine the given threshold for the convergence rate change above). As mentioned above, determining the updated measurement matrix may be based on one of either Distributed sensing or Kronecker sensing, or other techniques understood in the art. As also noted above, determining the updated measurement matrix may be based on a restricted isometry property (RIP). In step 1075, the techniques herein may then direct at least certain sensors of the plurality of sensors to operate according to the updated measurement matrix, accordingly. (For example, the management entity may direct the end nodes, or may direct the fusion center to then relay the instruction to the end nodes, and so on.)

The illustrative procedure 1000 may then end in step 1080, notably to continue sensing in step 1010, whether with an updated measurement matrix or original measurement matrix, according to the particular path taken in the procedure above.

It should be noted that while certain steps within procedures 700 and 1000 may be optional as described above, the steps shown in FIGS. 7A-7B and 10A-10B are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700 and 1000 are described separately, certain steps from each procedure may be incorporated into each other procedure, and the procedures are not meant to be mutually exclusive.

The techniques described herein, therefore, provide for adaptively calibrated spatio-temporal compressive sensing in sensor networks. In particular, the techniques herein effectively adapt (e.g., recalibrate) compressive sensing measurement protocols for two-dimensional sensing, particularly joint spatio-temporal CS measurements and adaptation. Furthermore, the techniques herein are able to distinguish the RF noise (for communication channel) and impulse noise (for sensing/outliers) for calibration, and identify the noise from the sensed data, explicitly measuring it, and mitigating its (RF noise and sensing impulse noise) impact on the recovered data. That is, by measuring the noise explicitly, the techniques herein minimize the error in noise estimate, thereby ensuring appropriate measures are taken to reduce its impact.

While there have been shown and described illustrative embodiments that provide for adaptively calibrated spatio-temporal compressive sensing, it is to be understood that various other adaptations and modifications may be made within the intent and scope of the embodiments herein. For example, while certain embodiments are described herein with respect to using certain dimensions, particular time and space, the techniques herein are not limited as such and may be used for other two-dimensional sensing parameters, in other embodiments. Also, while certain types of networks are shown, such as IoT networks, sensor networks, LLNs, etc., any computer network operating with a plurality of sensors may utilize the techniques herein for two-dimensional compressive sensing. In addition, while certain protocols, equations, compressive sensing paradigms, etc., are shown, other suitable configurations may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
monitoring, by a management entity device comprising one or more processors that execute a process for a sensor network, a convergence rate of spatio-temporal compressive sensing measurements from a plurality of sensors in the sensor network operating according to a measurement matrix up to a halting criterion;
in response to detecting a change in the convergence rate of spatio-temporal compressive sensing measurements to a value below a given threshold, determining, by the management entity device, whether the change is due to impulse noise or due to continued sensed measurements;
in response to the change in the convergence rate of spatio-temporal compressive sensing measurements being due to continued sensed measurements, initiating, by the management entity device, a single-dimensional compressive sensing in a spatial domain at regular time intervals;
identifying and tracking, by the management entity device, gradient clusters from the single-dimensional compressive sensing;
in response to a change in joint spatio-temporal sparsity of tracked nodes of the gradient clusters, determining, by the management entity device, an updated measurement matrix based on the joint spatio-temporal sparsity of tracked nodes while satisfying one or more operating parameters; and
directing, by the management entity device, at least certain sensors of the plurality of sensors to operate according to the updated measurement matrix.

2. The method as in claim 1, further comprising:
in response to the change in the convergence rate of spatio-temporal compressive sensing measurements being due to impulse noise, continuing sensing with no adjustment to the measurement matrix.

3. The method as in claim 1, wherein determining whether the change is due to impulse noise or due to continued sensed measurements comprises:
performing a full sensor reading;
determining from the full sensor reading whether a number of outlier readings are above or below an outlier threshold;
in response to the number of outlier readings being above the outlier threshold, determining whether the outlier readings are repeated over consecutive instances;
determining that the change is due to continued sensed measurements in response to determining that the outlier readings are above the outlier threshold and repeated over consecutive instances; and
determining that the change is due to impulse noise in response to determining that the outlier readings are either below the outlier threshold or not repeated over consecutive instances.

4. The method as in claim 1, further comprising:
in response to detecting the change in the convergence rate of spatio-temporal compressive sensing measurements to the value below a given threshold, and prior to determining whether the change is due to impulse noise or due to continued sensed measurements, assessing a quiet line noise measurement to determine if there is noise due to communication factors; and
in response to there being noise due to communication factors, adjusting a compression ratio of the spatio-temporal compressive sensing measurements downward.

5. The method as in claim 4, wherein adjusting the compression ratio downward comprises an adjustment between 0-10% for every 3 dB increase in noise power of the noise.

6. The method as in claim 1, further comprising:
in response to no change in joint spatio-temporal sparsity of tracked nodes of the gradient clusters, reassessing a recovery metric of the measurement matrix; and
continuing sensing with the reassessed recovery metric.

7. The method as in claim 1, wherein the single-dimensional compressive sensing uses a measurement matrix from a reassessed spatial sparsity with a compression rate inline with the one or more operating parameters.

8. The method as in claim 1, further comprising:
determining the updated measurement matrix based on one of either Distributed sensing or Kronecker sensing.

9. The method as in claim 1, wherein determining the updated measurement matrix is based on a restricted isometry property (RIP).

10. The method as in claim 1, further comprising:
redefining the given threshold when determining the updated measurement matrix.

11. The method as in claim 1, wherein the change in the convergence rate of spatio-temporal compressive sensing measurements is due to one of: a lasting change of the joint spatio-temporal sparsity of data; an increase in noise in communication of the data; and interference in the sensor network.

12. The method as in claim 1, wherein the halting criterion is a number of iterations.

13. The method as in claim 1, wherein the management entity device is in a cloud network remote from the sensor network.

14. The method as in claim 1, wherein the management entity device is part of a fusion center of the sensor network.

15. The method as in claim 1, wherein the one or more operating parameters are selected from a group consisting of: noise parameters; power saving parameters; and security parameters.

16. A tangible, non-transitory, computer-readable medium storing program instructions that cause a computer to execute a process, comprising:
monitoring, by a management entity device comprising one or more processors that execute a process for a sensor network, a convergence rate of spatio-temporal compressive sensing measurements from a plurality of sensors in the sensor network operating according to a measurement matrix up to a halting criterion;
in response to detecting a change in the convergence rate of spatio-temporal compressive sensing measurements to a value below a given threshold, determining, by the management entity device, whether the change is due to impulse noise or due to continued sensed measurements;
in response to the change in the convergence rate of spatio-temporal compressive sensing measurements being due to continued sensed measurements, initiating, by the management entity device, a single-dimensional compressive sensing in a spatial domain at regular time intervals;

identifying and tracking, by the management entity device, gradient clusters from the single-dimensional compressive sensing;

in response to a change in joint spatio-temporal sparsity of tracked nodes of the gradient clusters, determining, by the management entity device, an updated measurement matrix based on the joint spatio-temporal sparsity of tracked nodes while satisfying one or more operating parameters; and directing, by the management entity device, at least certain sensors of the plurality of sensors to operate according to the updated measurement matrix.

17. The computer-readable medium as in claim 16, wherein the process further comprises:

in response to the change in the convergence rate of spatio-temporal compressive sensing measurements being due to impulse noise, continuing sensing with no adjustment to the measurement matrix.

18. The computer-readable medium as in claim 16, wherein the process, for determining whether the change is due to impulse noise or due to continued sensed measurements, comprises:

performing a full sensor reading;

determining from the full sensor reading whether a number of outlier readings are above or below an outlier threshold;

in response to the number of outlier readings being above the outlier threshold, determining whether the outlier readings are repeated over consecutive instances;

determining that the change is due to continued sensed measurements in response to determining that the outlier readings are above the outlier threshold and repeated over consecutive instances; and determining that the change is due to impulse noise in response to determining that the outlier readings are either below the outlier threshold or not repeated over consecutive instances.

19. The computer-readable medium as in claim 16, wherein the process further comprises:

in response to detecting the change in the convergence rate of spatio-temporal compressive sensing measurements to the value below a given threshold, and prior to determining whether the change is due to impulse noise or due to continued sensed measurements, assessing a quiet line noise measurement to determine if there is noise due to communication factors; and in response to there being noise due to communication factors, adjusting a compression ratio of the spatio-temporal compressive sensing measurements downward.

20. An apparatus, comprising:

one or more network interfaces to communicate with a network;

a processor coupled to the network interfaces and configured to execute one or more processes; and a memory configured to store a process executable by the processor, the process when executed configured to:

monitor a convergence rate of spatio-temporal compressive sensing measurements from a plurality of sensors in a sensor network operating according to a measurement matrix up to a halting criterion;

determine, in response to detecting a change in the convergence rate of spatio-temporal compressive sensing measurements to a value below a given threshold, whether the change is due to impulse noise or due to continued sensed measurements;

initiate, in response to the change in the convergence rate of spatio-temporal compressive sensing measurements being due to continued sensed measurements, a single-dimensional compressive sensing in a spatial domain at regular time intervals;

identify and track gradient clusters from the single-dimensional compressive sensing;

determine in response to a change in joint spatio-temporal sparsity of tracked nodes of the gradient clusters, an updated measurement matrix based on the joint spatio-temporal sparsity of tracked nodes while satisfying one or more operating parameters; and direct at least certain sensors of the plurality of sensors to operate according to the updated measurement matrix.

* * * * *